D. Oliver.
Hedge Trimmer.
No. 53,033.          Patented Mar. 6, 1866.

UNITED STATES PATENT OFFICE.

DAVID OLIVER, OF CARTHAGE, ILLINOIS.

IMPROVEMENT IN HEDGE-CUTTING MACHINES.

Specification forming part of Letters Patent No. 53,033, dated March 6, 1866.

*To all whom it may concern:*

Be it known that I, DAVID OLIVER, of Carthage, in the county of Hancock and State of Illinois, have invented a new and useful Improvement in Hedge-Trimmers; and I do hereby declare that the following is a full, clear, and exact description thereof, which will enable others skilled in the art to make and use the same, reference being had to the accompanying drawings, forming part of this specification, in which—

Figure 1:
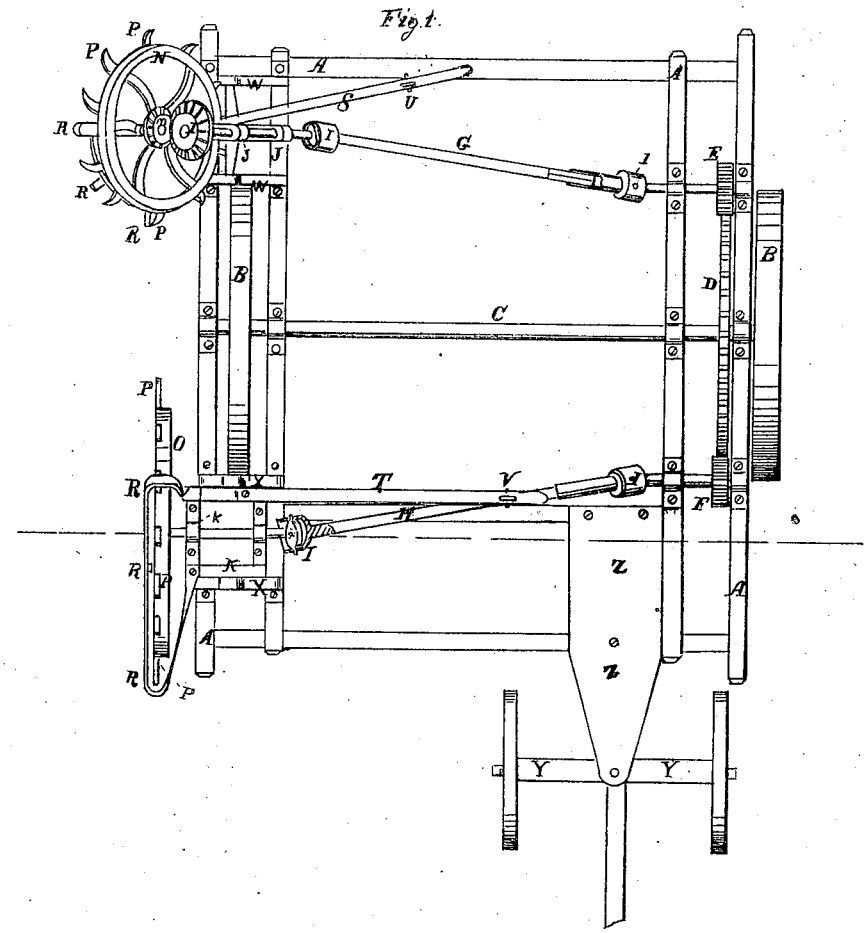
Figure 2:
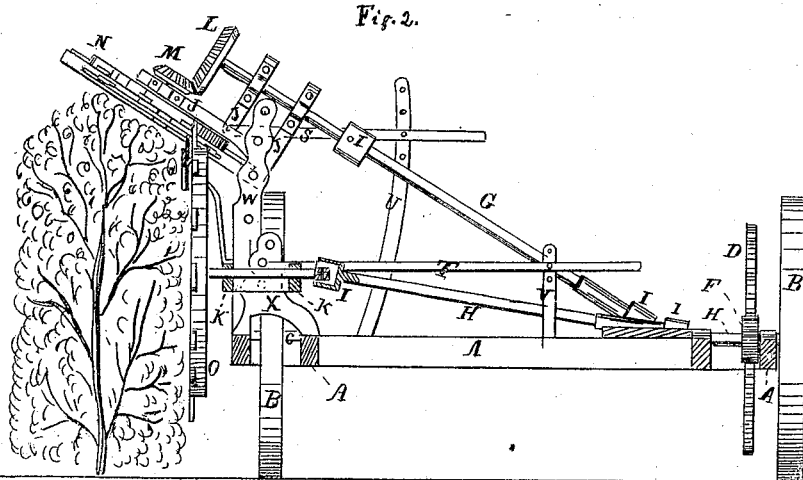

Figure 1 is a top or plan view of my improved hedge-trimmer. Fig. 2 is a sectional view through the line $x\,x$, Fig. 1.

Similar letters of reference indicate like parts.

My invention has for its object the furnishing a hedge-trimmer by means of which the side and top of a hedge may be trimmed evenly and expeditiously; and it consists, first, of the combination of the cutter cylinders or wheels for trimming the edges and top of a hedge with the adjustable bridge-trees, by means of which the cutter-wheels may be raised or lowered or set at any required inclination, and with the shafts by which motion is communicated to said cutter-wheels; second, of the combination of the bridge-trees with the supports in which they are hung and with the cutter-wheels; third, of the combination of Baylor's universal joint (patented July 19, 1859) with the cutter-wheel shafts; fourth, of the combination of the guards with the cutter-wheels; fifth, of the combination of the levers by which the inclination of the cutter-wheels is regulated with the bridge-trees; and, sixth, of the combination of the truck-wheels with the hedge-trimmer, as hereinafter more fully described.

A is the frame-work, to which the machinery of the hedge-trimmer is attached. B are the wheels, which carry and at the same time drive the machine, one or both of which should be corrugated to insure their revolution and the consequent action of the machine.

C is the main or driving wheel shaft, to which is attached a gear-wheel, D, which, by means of gear-wheels E and F, imparts motion to the cutter-wheel shafts G and H. The parts of the cutter-wheel shafts are coupled with Baylor's universal joint I, by which provision is made for the changes in the length and in direction of the shafts G and H required by the changes of inclination of the cutter-wheels. The ends of the shafts G and H which are connected with the cutter-wheels revolve in bearings upon and are supported by the bridge-trees J and K. The shaft G terminates in a bevel-gear wheel, L, meshing into a bevel-gear wheel, M, attached to the axle of the cutter wheel or cylinder N. The cutter-wheel N revolves in bearings attached to an arm, $j'$, projecting from the bridge-tree J, as shown in Fig. 2. The cutter-wheel O is attached directly to the end of the shaft H and revolves with the revolution of said shaft. To the side or edge of the cutter-wheels N and O are attached the knives P.

R are guards attached to the bridge-trees, and which may be so attached as to be either inside or outside of the knives P, or the machine may be used without them; but I prefer to use them, as they furnish a support to the branches while being cut by the knives P.

The inclination of the cutter-wheels is regulated by the levers S and T, one end of which is attached to the bridge-trees J and K, and the other ends are sustained in the proper position to give the required inclination to the cutter-wheels by being secured to the standards U and V by pins, as seen in Fig. 2, there being a series of pin-holes in said standards U and V, so that the position of the levers may be regulated at pleasure.

W and X are the supports which sustain, and to which are pivoted, the bridge-trees J and K. These supports are also made with a series of holes, so that the height of the cutter-wheels may be regulated according to the circumstances of the particular hedge to be trimmed.

The supports W and X, instead of being attached directly to the frame A, may be attached to slotted or sliding rests on said frame, by which means the cutter-wheels may be slipped into and away from the hedge at pleasure.

Y is a pair of truck-wheels, which is pivoted to a piece of timber, Z, attached to the frame A of the machine; or the draft may be attached directly to the machine, and in some circumstances this manner of attaching the draft may be preferable, as giving the operator a more complete control over the machine.

Having thus described my invention, I claim as new and desire to secure by Letters Patent—

1. The combination of the cutter wheels or cylinders N and O with the adjustable bridge-trees J and K, and with the shafts G and H, substantially as described, and for the purpose set forth.

2. The combination of the bridge-trees J and K with the supports W and X, and with the cutter-wheels N and O, substantially as described, and for the purpose set forth.

3. The combination of Baylor's universal joint I with the cutter-wheel shafts G and H of a hedge-trimmer, substantially as described, and for the purpose set forth.

4. The combination of the guards R with the cutter-wheels N and O, substantially as described, and for the purpose set forth.

5. The combination of the levers S and T with the bridge-trees J and K, substantially as described, and for the purpose set forth.

The above specification of my invention signed by me this 31st day of October, 1865.

DAVID OLIVER.

Witnesses:
G. BARRERE,
DANIEL ABBOTT.